United States Patent
Seo

(10) Patent No.: US 10,113,790 B2
(45) Date of Patent: Oct. 30, 2018

(54) METHOD FOR CONTROLLING REFRIGERATOR

(71) Applicant: LG ELECTRONICS INC., Seoul (KR)

(72) Inventor: Sangwook Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 246 days.

(21) Appl. No.: 14/794,461

(22) Filed: Jul. 8, 2015

(65) Prior Publication Data
US 2016/0195329 A1    Jul. 7, 2016

(30) Foreign Application Priority Data
Jan. 5, 2015    (KR) .................. 10-2015-0000696

(51) Int. Cl.
*F25B 1/00*    (2006.01)
*F25D 29/00*    (2006.01)
(Continued)

(52) U.S. Cl.
CPC ............ *F25D 29/00* (2013.01); *F25B 49/022* (2013.01); *F25D 11/00* (2013.01); *F25D 17/065* (2013.01); *G05B 15/02* (2013.01); *F25B 2400/01* (2013.01); *F25B 2600/0251* (2013.01); *F25D 2600/00* (2013.01)

(58) Field of Classification Search
CPC ........ F25D 29/00; F25D 17/065; F25D 11/00; F25D 2600/00; F25D 7/065; G05B 15/02; F25B 49/022; F25B 2400/01; F25B 2600/0251; F25B 2600/024; F25B 2600/0253; F25B 2700/15; F25B 2700/151; F25B 2321/0212; F24F 2011/0047
See application file for complete search history.

(56) References Cited

U.S. PATENT DOCUMENTS 3,675,437 A    7/1972 Linstromberg
4,071,745 A *  1/1978 Hall ..................... G05B 19/075
                                                165/11.1
(Continued)

FOREIGN PATENT DOCUMENTS

CN    101676639    3/2010
CN    102338545    2/2012
(Continued)

OTHER PUBLICATIONS

Korean Office Action dated Oct. 31, 2016 issued in Application No. 10-2015-0000696.
(Continued)

*Primary Examiner* — Keith Raymond
*Assistant Examiner* — Miguel A Diaz
(74) *Attorney, Agent, or Firm* — KED & Associates LLP

(57) ABSTRACT

Provided is a method for controlling a refrigerator. The method includes turning on power of the refrigerator and starting a compressor; setting a predetermined power consumption parameter to a default value; measuring power consumption within a set period during an operation of the refrigerator; recognizing whether the measured power consumption is smaller than previous power consumption; and changing a value of the power consumption parameter when the measured power consumption is greater than the previous power consumption.

5 Claims, 5 Drawing Sheets

(51) Int. Cl.
*F25B 49/02* (2006.01)
*F25D 11/00* (2006.01)
*G05B 15/02* (2006.01)
*F25D 17/06* (2006.01)

(56) References Cited

U.S. PATENT DOCUMENTS

| | | | | |
|---|---|---|---|---|
| 4,653,285 A * | 3/1987 | Pohl | ............ | F25B 49/025 |
| | | | | 318/729 |
| 4,870,833 A | 10/1989 | Matsuda et al. | | |
| 5,560,422 A * | 10/1996 | Matumoto | ............ | F24F 11/0009 |
| | | | | 165/253 |
| 6,053,002 A * | 4/2000 | Matsumoto | ............ | F24F 11/008 |
| | | | | 318/803 |
| 6,216,478 B1 * | 4/2001 | Kang | ............ | F25D 29/00 |
| | | | | 62/228.4 |
| 6,478,084 B1 * | 11/2002 | Kumar | ............ | F24F 11/0012 |
| | | | | 165/238 |
| 6,487,869 B1 * | 12/2002 | Sulc | ............ | B60H 1/3205 |
| | | | | 62/228.4 |
| 7,228,694 B2 * | 6/2007 | Schwarz | ............ | F25B 49/025 |
| | | | | 62/157 |
| 8,378,835 B2 * | 2/2013 | Shin | ............ | F25D 17/065 |
| | | | | 340/635 |
| 9,140,478 B2 * | 9/2015 | Gomes | ............ | F25D 11/02 |
| 9,534,821 B2 * | 1/2017 | Yoon | ............ | F25B 49/022 |
| 9,746,225 B2 * | 8/2017 | Eom et al. | ............ | F25B 49/00 |
| | | | | 62/180 |
| 9,791,162 B2 * | 10/2017 | Kobayashi et al. | ... | G05B 21/00 |
| 2004/0237551 A1 * | 12/2004 | Schwarz | ............ | F25B 49/025 |
| | | | | 62/229 |
| 2004/0244395 A1 | 12/2004 | Kim et al. | | |
| 2005/0022543 A1 | 2/2005 | Shim | | |
| 2005/0039469 A1 | 2/2005 | Nonaka et al. | | |
| 2005/0086952 A1 | 4/2005 | Nonaka et al. | | |
| 2005/0183434 A1 * | 8/2005 | Iritani | ............ | F25B 31/006 |
| | | | | 62/228.1 |
| 2008/0014852 A1 | 1/2008 | Mielke et al. | | |
| 2008/0190125 A1 | 8/2008 | Yoshioka et al. | | |
| 2009/0235677 A1 * | 9/2009 | Yanagida | ............ | F25B 49/025 |
| | | | | 62/115 |
| 2010/0017242 A1 * | 1/2010 | Hamilton, II et al. | ............ | |
| | | | | G06Q 10/00 |
| | | | | 705/8 |
| 2010/0064708 A1 | 3/2010 | Seki | | |
| 2010/0179693 A1 * | 7/2010 | Sung | ............ | F25B 49/025 |
| | | | | 700/275 |
| 2010/0293977 A1 * | 11/2010 | Tanaka | ............ | F25D 11/00 |
| | | | | 62/186 |
| 2011/0175742 A1 * | 7/2011 | Shin | ............ | F25D 17/065 |
| | | | | 340/635 |
| 2011/0197607 A1 * | 8/2011 | Tanaka | ............ | F24F 11/008 |
| | | | | 62/180 |
| 2012/0023980 A1 * | 2/2012 | Lee | ............ | F25B 1/10 |
| | | | | 62/115 |
| 2012/0210737 A1 * | 8/2012 | Giardino | ............ | F25D 29/00 |
| | | | | 62/115 |
| 2012/0312034 A1 * | 12/2012 | Oh | ............ | F25B 1/10 |
| | | | | 62/84 |
| 2013/0186111 A1 * | 7/2013 | Kim | ............ | F25B 49/022 |
| | | | | 62/56 |
| 2013/0274937 A1 | 10/2013 | Ahn et al. | | |
| 2013/0305751 A1 * | 11/2013 | Gomes | ............ | F25D 11/02 |
| | | | | 62/89 |
| 2014/0007611 A1 * | 1/2014 | Jeon | ............ | F25D 11/02 |
| | | | | 62/419 |
| 2014/0182318 A1 * | 7/2014 | Eom | ............ | F25B 49/02 |
| | | | | 62/129 |
| 2014/0260378 A1 * | 9/2014 | Gomes | ............ | F25B 49/022 |
| | | | | 62/115 |
| 2014/0316581 A1 * | 10/2014 | Fadell | ............ | F24F 11/0009 |
| | | | | 700/276 |
| 2015/0040307 A1 * | 2/2015 | Deloche | ............ | F24F 5/0071 |
| | | | | 4/493 |
| 2015/0121925 A1 * | 5/2015 | Park | ............ | F25B 49/022 |
| | | | | 62/151 |
| 2015/0121928 A1 * | 5/2015 | Lee | ............ | F25B 1/10 |
| | | | | 62/190 |
| 2015/0135750 A1 * | 5/2015 | Ushijima | ............ | F24H 4/02 |
| | | | | 62/159 |
| 2015/0192346 A1 * | 7/2015 | Lee | ............ | F25D 21/006 |
| | | | | 62/129 |
| 2015/0198345 A1 * | 7/2015 | Bicknell | ............ | F24F 11/00 |
| 2015/0204592 A1 * | 7/2015 | Iwasaki | ............ | F24F 11/006 |
| | | | | 62/156 |
| 2015/0330703 A1 * | 11/2015 | Satou | ............ | F25D 29/00 |
| | | | | 700/300 |
| 2015/0362239 A1 * | 12/2015 | Chen | ............ | F25B 49/022 |
| | | | | 62/228.4 |
| 2016/0061507 A1 * | 3/2016 | Penn, II | ............ | H02P 29/024 |
| | | | | 318/461 |
| 2016/0153686 A1 * | 6/2016 | Matsui | ............ | F24F 11/001 |
| | | | | 62/183 |
| 2017/0059228 A1 * | 3/2017 | Hu | ............ | F25D 17/065 |
| 2017/0074568 A1 * | 3/2017 | Orozco et al. | ............ | F25B 49/02 |
| 2017/0089625 A1 * | 3/2017 | Wallace | ............ | F25B 31/00 |
| 2017/0141709 A1 * | 5/2017 | Fukuda | ............ | H02P 7/06 |
| 2017/0152850 A1 * | 6/2017 | Ryu | ............ | F04B 49/20 |
| 2017/0292742 A1 * | 10/2017 | Douglas | ............ | F25B 49/02 |
| 2018/0106519 A1 * | 4/2018 | Hwang et al. | ............ | F25B 49/02 |

FOREIGN PATENT DOCUMENTS

| | | |
|---|---|---|
| CN | 102345951 | 2/2012 |
| CN | 103216983 | 7/2013 |
| KR | 10-2008-0022002 A | 3/2008 |
| KR | 20110087465 A * | 8/2011 |
| KR | 10-2010-0058918 | 12/2011 |
| WO | WO 03/019090 A1 | 3/2003 |

OTHER PUBLICATIONS

Korean Office Action issued in Application No. 10-2015-0000696 dated Apr. 19, 2016.
European Search Report issued in Application No. 15194250.5 dated Jun. 1, 2016.
United States Office Action dated May 8, 2018 issued in co-pending related U.S. Appl. No. 14/924,865.
Chinese Office Action issued in Application 201510654633.9 dated Sep. 22, 2017 (full Chinese text and full English translation).
United States Office Action dated Dec. 12, 2017 issued in co-pending U.S. Appl. No. 14/924,865.

* cited by examiner

METHOD FOR CONTROLLING REFRIGERATOR

CROSS-REFERENCE TO RELATED APPLICATIONS

The present application claims priority under 35 U.S.C. § 119 to Korean Patent Application No. 10-2015-0000696 filed on Jan. 5, 2015, which is hereby incorporated by reference in its entirety.

BACKGROUND

1. Field

The present disclosure relates to a method for controlling a refrigerator.

2. Background

In general, refrigerators include a plurality of storage compartments, in which foods are accommodated for frozen or refrigerated storage and one side of which is opened to store the foods into the storage compartments and to take the foods out of the storage compartments. The plurality of storage compartments includes a freezing compartment for frozen storage of foods and a refrigerating compartment for refrigerated storage of foods.

In a refrigerator, a refrigeration system in which a refrigerant is circulated is operated. Apparatuses constituting the refrigeration system include a compressor, a condenser, an expander, and an evaporator. Cooling air generated from the evaporator may be supplied to the freezing compartment or the refrigerating compartment.

Refrigerators are continuously operating appliances which continue to operate once power cords thereof are plugged in, and may be electrical appliances which have relatively large power consumption among various kinds of electrical appliances. Thus, in recent years, a technology for predicting or measuring the power consumption of a refrigerator has been proposed to efficiently perform power management of refrigerators.

The present applicant has proposed a technology for predicting amounts of power consumption of electrical appliances and has filed a patent application as below.

1. Application No. (filing date): KR 10-2010-0058918 (Jun. 22, 2010)
2. Title of the invention: Network system.

According to this related art, power consumption of an energy consumption unit constituting an electrical appliance may only be predicted by using an information value stored in a memory, but there is a limitation in performing an operation of substantially reducing power consumption while monitoring the operation state of the electrical appliance.

SUMMARY

Embodiments provide a method for controlling a refrigerator, capable of reducing power consumption.

In one embodiment, a method for controlling a refrigerator, the method includes: turning on power of the refrigerator and starting a compressor; setting a predetermined power consumption parameter to a default value; measuring power consumption within a set period during an operation of the refrigerator; recognizing whether the measured power consumption is smaller than previous power consumption; and changing a value of the power consumption parameter when the measured power consumption is greater than the previous power consumption.

When the measured power consumption is smaller than the previous power consumption, the values of the power consumption parameters may be finally determined.

Storing the measured power consumption in a memory part may be further included, and the previous power consumption may include one or more pieces of information regarding power consumption, which are cumulatively stored in the memory part previously.

The predetermined power consumption parameters may include cooling capacity of the compressor, a voltage applied to a fan, or a temperature control interval of a storage compartment.

The changing of the value of the power consumption parameter may include reducing of the cooling capacity of the compressor by a predetermined amount to increase a turned-on period of the compressor.

The predetermined amount may correspond to about 5% with respect to the current cooling capacity of the compressor.

The changing of the value of the power consumption parameter may include reducing of the voltages applied to the fans by a predetermined amount to increase the turned-on period of the compressor.

The changing of the value of the power consumption parameter may include increasing of upper and lower widths of the temperature control interval of the storage compartment to increase the turned-on period of the compressor.

Recognizing whether a predetermined event occurs, and setting the predetermined power consumption parameters to the default value again when the predetermined event occurs, may be included.

The predetermined event may include a defrosting operation of the refrigerator, opening of a refrigerator door, or turning on again after turning off of the refrigerator.

The default value of the power consumption parameter may be a predetermined maximum value of the power consumption parameter.

The default value of the power consumption parameter may be a parameter value which is set, in a state where the defrost operation of the refrigerator is performed, in a state where the refrigerator door is opened, in a state where a set temperature of the storage compartment of the refrigerator is lowered to a temperatures equal to or less than a predetermined temperature, or in a state where a humidity of an installing space of the refrigerator is not less than the predetermined value.

The set period may include a turned-on period of the compressor.

The measuring of the power consumption may include calculating final power consumption by using power consumption of the compressor and previously stored power consumption information for a plurality of power consumption units.

The plurality of power consumption units may include a refrigerator fan, a heater, or an ice maker.

In another embodiment, a method for controlling a refrigerator includes: turning on power of the refrigerator and starting a compressor; setting a predetermined power consumption parameters to a default value; measuring power consumption during an operation of the refrigerator; and performing a variable power consumption parameter control when the measured power consumption is greater than previously stored power consumption, wherein the power consumption is determined by using a power value recognized during a set period within a turned-on period of the compressor.

The power consumption may be determined by calculating an accumulated value of the power consumption measured multiple times after measuring power consumption during the set time from the turn-on to the turn-off of the compressor.

Storing the measured power consumption may be further included, and the storing of the measured power consumption may be performed a predetermined number of times or more.

When the stored power consumption information is greater than the previously stored power consumption information, or when the storing is performed less than the predetermined number of times, the variable power consumption parameter control may be performed.

The variable power consumption parameter control may include controls for adjusting a cooling capacity of the compressor, adjusting a voltage applied to fan included in the refrigerator, and adjusting a temperature control interval of the storage compartment of the refrigerator.

The details of one or more embodiments are set forth in the accompanying drawings and the description below. Other features will be apparent from the description and drawings, and from the claims.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings. However, the inventive concept is not limited to the aforesaid embodiments, and it will be apparent to those skilled in the art that various modifications and variations can be made in the present invention without departing from the spirit or scope of the invention.

Figure 1:
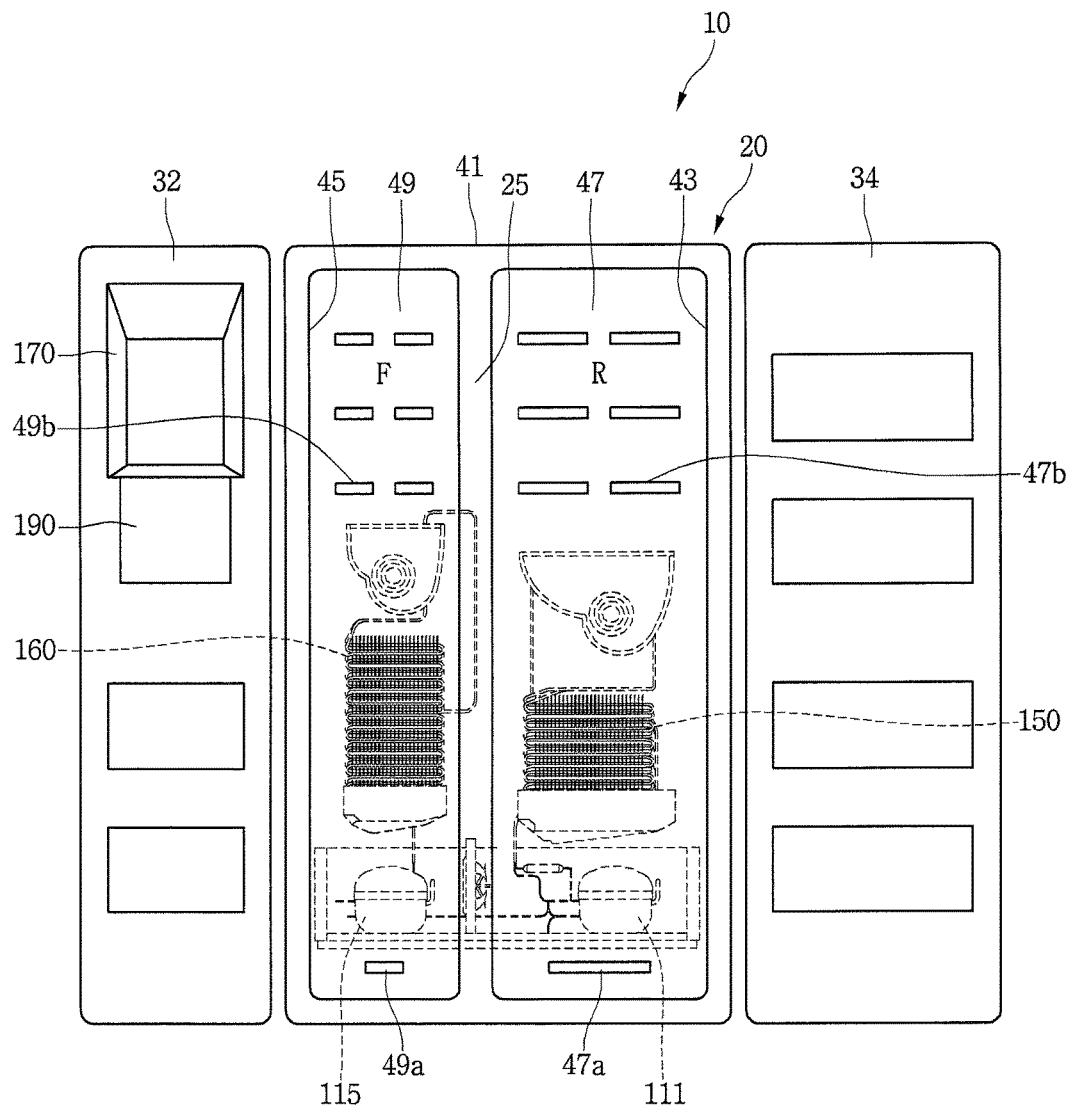
FIG. 1 is a front view illustrating a configuration of a refrigerator according to an embodiment.
Figure 2:
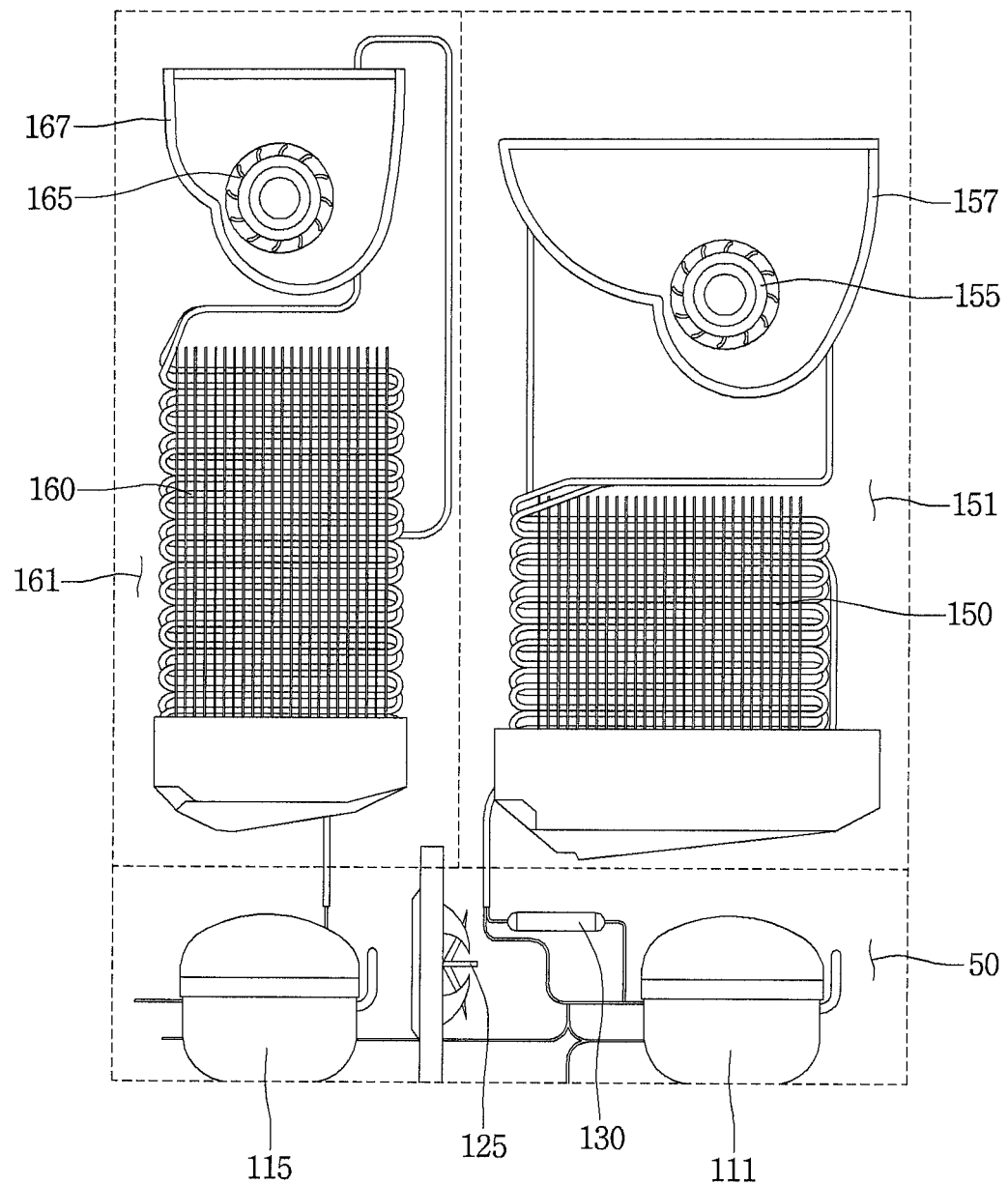
FIG. 2 is a view illustrating a part of a configuration of a refrigerator according to an embodiment when viewed from a front side of the refrigerator.

FIG. 1 is a front view illustrating a configuration of a refrigerator according to an embodiment, and FIG. 2 is a front view illustrating a part of a configuration of a refrigerator according to an embodiment when viewed from a front side of the refrigerator.

Referring to FIGS. 1 and 2, a first refrigerator 10 according to an embodiment includes a cabinet 20 in which a freezing compartment F and a refrigerating compartment R are defined. The freezing compartment F and the refrigerating compartment R are formed independently in the cabinet 20, and may be separated by a partition wall 25. Although the freezing compartment F and the refrigerating compartment R are disposed to be horizontally spaced apart from each other according to the inventive concept illustrated in the drawings, alternatively, the freezing compartment F and the refrigerating compartment R may be vertically spaced apart from each other.

The cabinet 20 includes a freezing compartment door 32 for opening/closing the freezing compartment F and a refrigerating compartment door 34 for opening/closing the refrigerating compartment R. In the freezing compartment door 32, an ice making unit 170 for making and storing ice and a dispenser 190 for dispensing the ice made in the ice making unit 170 or water may be disposed. The ice making unit 170 may include an ice maker 172 (see FIG. 3) for making ice.

Also, the cabinet 20 includes an outer case 41 defining an appearance of the refrigerator 10; a freezing compartment inner case 45 disposed inside the outer case 41 to define an inner surface of the freezing compartment F; and a refrigerating compartment inner case 43 disposed inside the outer case 41 to define an inner surface of the refrigerating compartment R.

The refrigerator 10 includes a plurality of evaporators 150 and 160 for independently cooling the refrigerating compartment R and the freezing compartment F, respectively. The plurality of evaporators 150 and 160 include a refrigerating-side evaporator 150 for cooling the refrigerating compartment R and a freezing-side evaporator 160 for cooling the freezing compartment F.

The cabinet 20 includes a freezing compartment rear panel 49 partitioning an inner space of the freezing compartment inner case 45 into the freezing compartment F in which foods are stored in a frozen state and a freezing-side heat-exchange chamber 161 accommodating the freezing-side evaporator 160. That is, the freezing compartment rear panel 49 may be understood as a "freezing compartment cover" which is a storage compartment cover covering the freezing-side heat-exchange chamber 161 from the freezing compartment F.

In the freezing compartment rear panel 49, a cooling air intake port 49a through which cooling air of the freezing compartment F is introduced into the freezing-side heat-exchange chamber 161, and a cooling air discharge port 49b through which cooling air cooled by the freezing-side evaporator 160 is discharged to the freezing compartment F, may be formed. Also, in the freezing-side heat-exchange chamber 161, a freezing-side fan 165 may be disposed as a "blower fan" circulating air in the freezing compartment F to the freezing-side heat-exchange chamber 161 and the freezing compartment F.

The cabinet 20 includes a refrigerating compartment rear panel 47 partitioning an inner space of the refrigerating compartment inner case 43 into the refrigerating compartment R in which foods are stored in a refrigerated state and a refrigerating-side heat-exchange chamber 151 accommodating the refrigerating-side evaporator 150. The refrigerating-side heat-exchange chamber 151 and the freezing-side heat-exchange chamber 161 may be referred to as a "heat-exchange chamber" as a whole.

That is, the refrigerating compartment evaporator 47 may be understood as a "refrigerating compartment cover" which is a storage compartment cover shielding the refrigerating-side heat-exchange chamber 151 from the refrigerating compartment R. The refrigerating compartment cover and the freezing compartment cover may be provided at both sides of the partitioning wall 25.

In the refrigerating compartment rear panel 47, a cooling air intake port 47a through which cooling air of the refrigerating compartment R is introduced into the refrigerating-side heat-exchange chamber 151, and a cooling air discharge port 47b through which cooling air cooled by the refrigerating compartment evaporator 150 is discharged to the refrigerating compartment R, may be formed. Also, in the refrigerating-side heat-exchange chamber 151, a refrigerating-side fan 155 may be disposed as a "blower fan" circulating air in the refrigerating compartment R to the refrigerating-side heat-exchange chamber 151 and the refrigerating compartment R.

The refrigerator 10 includes a plurality of compressors 111 and 115, a condenser (not shown) condensing the refrigerant compressed in the plurality of compressors 111 and 115, and the plurality of evaporators 150 and 160.

The plurality of compressors 111 and 115 may include a first compressor 111 and a second compressor 115. The second compressor 115 is a "low-pressure compressor" disposed at a low-pressure side to perform a first stage compression of the refrigerant, and the first compressor 111 is a "high-pressure compressor" performing a further compression (second stage compression) on the refrigerant compressed in the second compressor 115.

The refrigerant evaporated in the freezing-side evaporator 160 may be suctioned into the second compressor 115, and the refrigerant compressed in the second compressor 115 is combined with the refrigerant evaporated in the refrigerating-side evaporator 160 and may be suctioned into the first compressor 111.

The refrigerator 10 may further include a dryer 130 which is disposed at an outlet side of the condenser and removes water or foreign substances contained in the refrigerant condensed by the condenser.

In the refrigerating-side heat-exchange chamber 151, a refrigerating-side fan 155 disposed at one side of the refrigerating-side evaporator 150 to circulate cooling air and a first flow guide 157 which accommodates the refrigerating-side fan 155 therein and guides the cooling air passing through the refrigerating-side fan 155 to the cooling air discharge outlet 47b.

In the freezing-side heat-exchange chamber 161, a freezing-side fan 165 disposed at one side of the freezing-side evaporator 160 to circulate cooling air and a second flow guide 167, which accommodates the freezing-side fan 165 therein and guides the cooling air passing through the freezing-side fan 165 to the cooling air discharge outlet 49b, are installed.

In a lower portion of the cabinet 20, a machine room 50 is defined. The machine room 50 may communicate with an indoor space, in which the refrigerator 10 is installed, to thereby keep a room temperature. In the machine room 50, the first and second compressors 111 and 115, the condenser, a condensing fan 125, and the dryer 130 may be installed.

Figure 3:
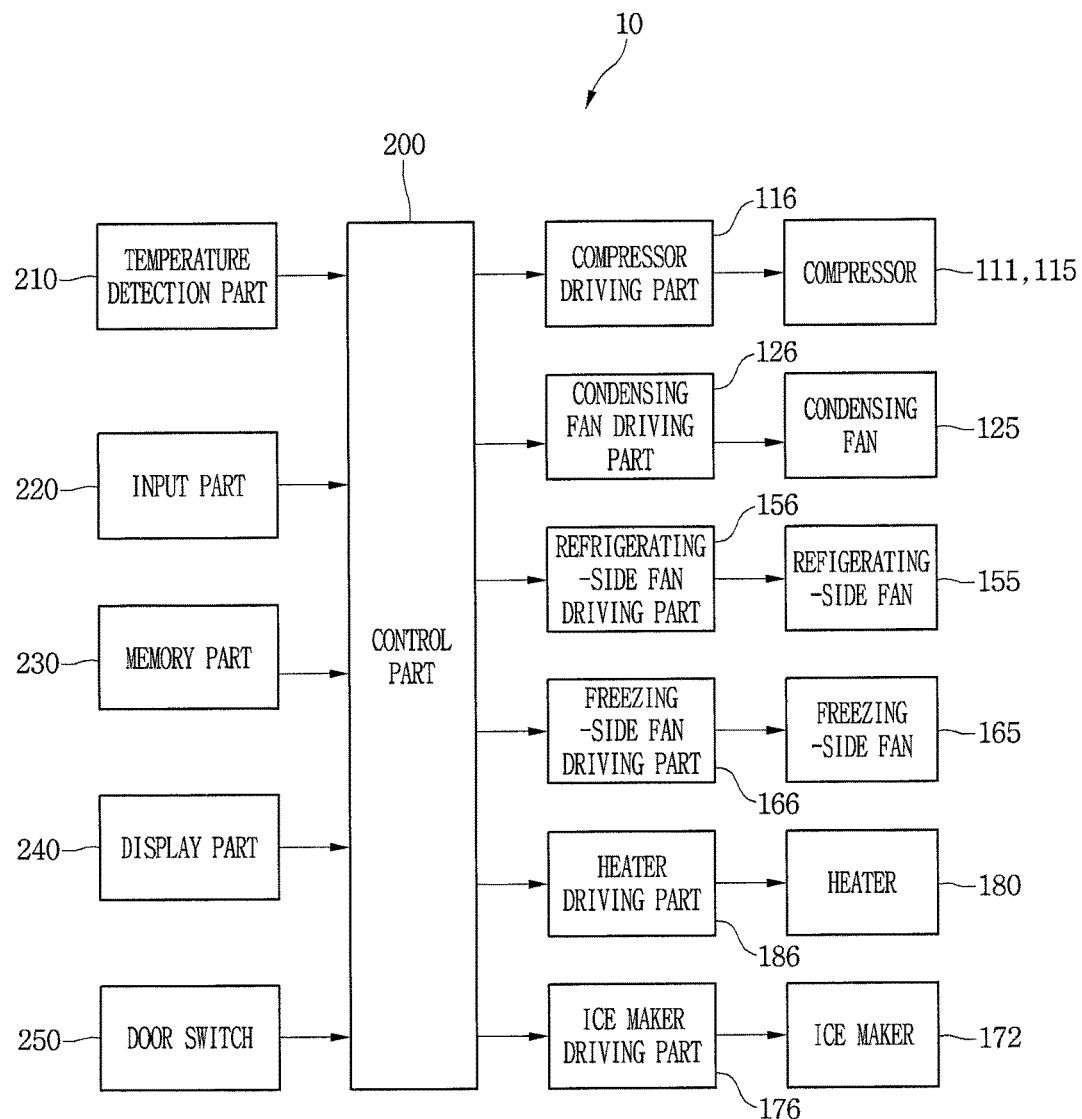
FIG. 3 is a block diagram illustrating a configuration of a refrigerator according to an embodiment.

FIG. 3 is a block diagram illustrating a configuration of a refrigerator according to an embodiment.

Referring to FIG. 3, the refrigerator 10 according to an embodiment further includes a temperature detection part 210 which detects a temperature inside the refrigerating compartment R or the freezing compartment F and transmits a signal for the detected temperature to a control unit 200.

The refrigerator 10 further includes an input part 220 by which operation conditions for operating the refrigerator may be input. The input part 220 may include an input portion by which information on set temperature of the refrigerating compartment or freezing compartment.

The refrigerator 10 further includes a memory part 230 which stores data required to operate the refrigerator 10. For example, in the memory part 230, amount of power consumption measured for each set period during an operation of the refrigerator may be stored. Also, in the memory part 230, power consumption information about each of a plurality of power consumption units installed in the refrigerator 10 may be stored. For example, the plurality of power consumption units may include a condensing fan 125, a refrigerating-side fan 155, a freezing-side fan 165, a heater 180, an ice maker 172, etc.

According to whether each of the power consumption units in the refrigerator, the memory part 230 may output corresponding power consumption information to the control part 200.

The refrigerator 10 further includes a display part 240 which displays information on operation states of the refrigerator. For example, the display part 240 may display set temperature information of the refrigerating compartment or freezing compartment, and information on a service type (ice cube, water, or crushed ice) of the dispenser 190.

The refrigerator 10 further includes door switches 250 which are respectively disposed at the freezing compartment door 32 and refrigerating compartment door 34, and may detect opened/closed states of the doors 32 and 34.

The refrigerator 10 further includes a compressor driving part 116 for driving the first and second compressors 111 and 115; a condensing fan driving part 126 for driving the condensing fan 125; a refrigerating-side fan driving part 156 for driving the refrigerating-side fan 155; and a freezing-side fan driving part 166 for driving the freezing-side fan 165. The compressor driving part 116 may include a first compressor driving part for driving the first compressor 111 and a second compressor driving part for driving the second compressor 115.

Also, the refrigerator 10 further includes a control part 200 which controls the driving of driving parts 116, 126, 156, and 166. The control part 200 may respectively output corresponding speed command values to the driving parts 116, 126, 156, and 166.

The refrigerator 10 further includes a heater driving part 186 for driving a heater 180. For example, the heater 180 may include a defrosting heater for removing frost formed on the refrigerating-side evaporator 150 or the freezing-side evaporator 160. The heater 180 may be disposed adjacent to the refrigerating-side evaporator 150 or the freezing-side evaporator 160. The control part 200 may control the heater driving part 186 to control the output of the heater 180.

The refrigerator 10 further includes an ice maker 172 which makes ice from the supplied water by using cooling air of the freezing compartment F, and an ice maker driving part 176 controlling the operation of the ice maker 172. For example, the ice maker driving part 176 may drive an ejector (not shown). The ejector is understood as a mechanism disposed at the ice maker 172 and dispensing the ice made.

Meanwhile, the control part 200 may calculate power consumption of the compressors through power information of the first and second compressors 111 and 115, which is detected at the compressor driving part 116. Also, the control part 200 may calculate final power consumption by using power consumption information which has been previously stored for each unit according to whether the plurality of power consumption units operate, and the calculated power consumption information of the compressors.

Specifically, the compressor driving part 116 may include a compressor control part. The compressor control part may calculate power consumption of the compressors based on output current flowing in a compressor motor.

Also, for the plurality of power consumption units, that is, the condensing fan 125, the refrigerating-side fan 155, the freezing-side fan 165, the heater 180, or the ice maker 172, power values consumed during operation of each unit are predetermined and stored in the memory part 230, and therefore power consumption information may be calculated according to whether the units operate.

In the memory part 230, power consumption according to number of revolutions of each fan may be stored for the condensing fan 125, the refrigerating-side fan 155, and the freezing-side fan 165, and power consumption information according to the output power value may be stored for the heater 180.

Figure 4:
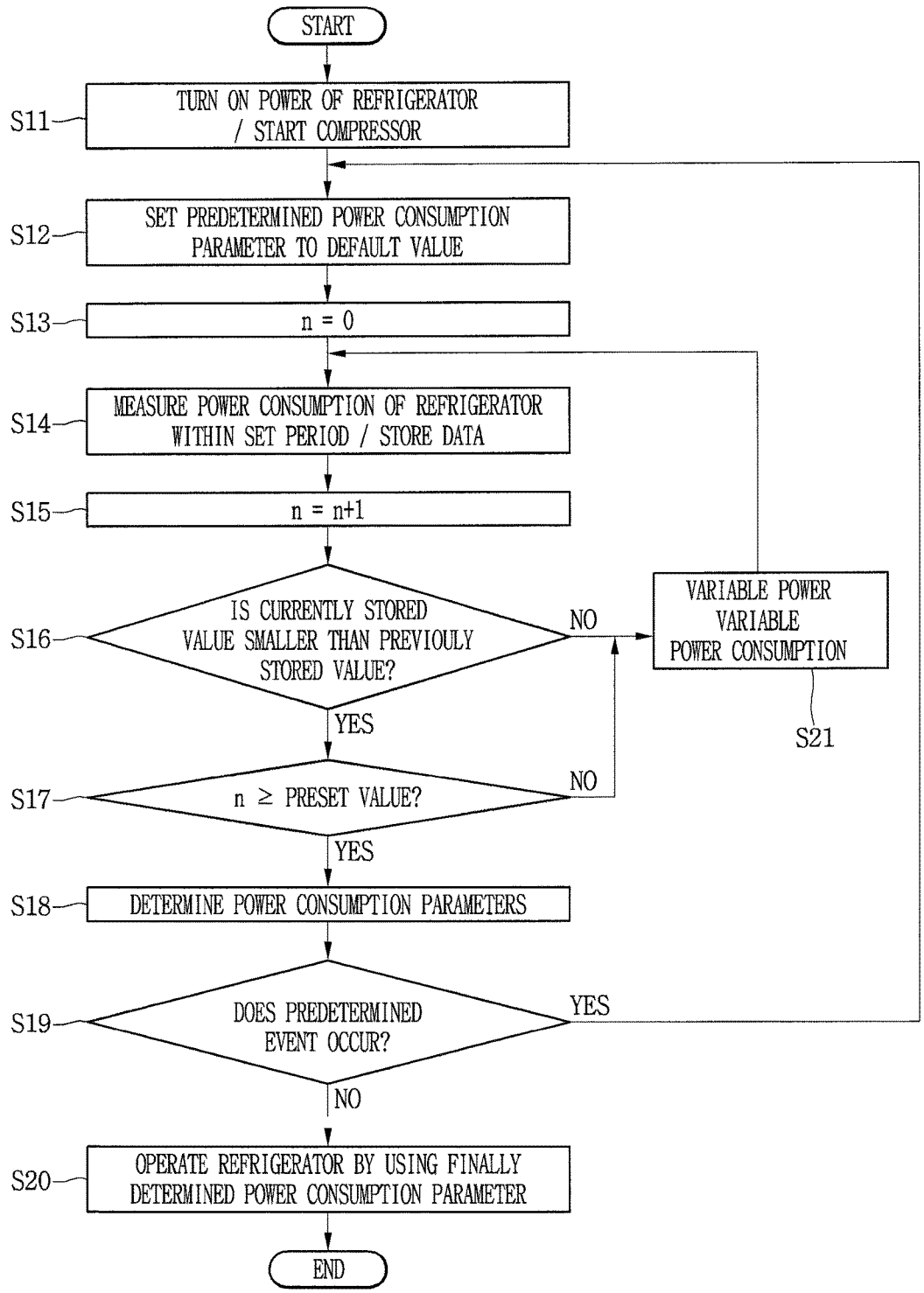
FIG. 4 is a flowchart illustrating a method for controlling a refrigerator according to an embodiment.
Figure 5:
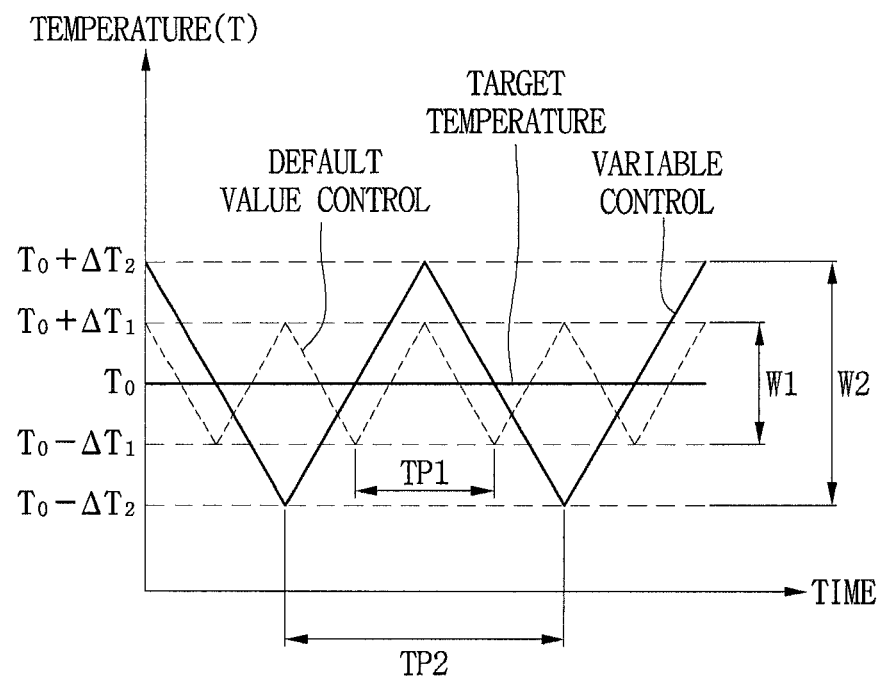
FIG. 5 is a graph showing a temperature change in a storage compartment over time when one of power consumption parameters is changed according to an embodiment.

FIG. 4 is a flowchart illustrating a method for controlling a refrigerator according to an embodiment, and FIG. 5 is a graph showing a temperature change in a storage compartment over time when one of power consumption parameters is changed according to an embodiment.

Referring to FIG. 4, when a refrigerator 10 is powered on and compressors 111 and 115 start operating (S11), predetermined power consumption parameters may be set to default values. The predetermined power consumption parameters may include cooling capacity of the compressor which has relatively large power consumption from among the plurality of power consumption units included in the refrigerator, voltages applied to the fans 125, 155, and 165, and the size of a temperature control interval of a storage compartment.

The cooling capacity of the compressor is understood as an output value determined according to the operating frequencies of the compressors 111 and 115. The cooling capacity of the compressor increases as the operating frequency increases, and decreases as the operating frequency decreases.

The voltages applied to the fans 125, 155, and 165 may include a voltage applied to the condensing fan 125, a voltage applied to the refrigerating-side fan 155, or a voltage applied to the freezing-side fan 165.

The temperature control interval of the storage compartment is understood as a temperature interval which is set by a set value from an upper limit to a lower limit with respect to a target temperature of the storage compartment which is set by a user. For example, the first compressor 111 or the second compressor 115 may be controlled to be turned on at an upper limit value higher than the target temperature and to be turned off at a lower limit value lower than the target temperature. When the temperature control interval of the storage compartment is changed, the turned-on periods of the first and second compressors 111 and 115 may be changed.

The default values of the power consumption parameters are understood as parameter values which are set in a state where a large amount of cooling capacity of the refrigerator is required, for example, in a state where the defrost operation of the refrigerator is performed, in a state where the refrigerator door is opened, in a state where a set temperatures of the storage compartment of the refrigerator is lowered to a value equal to or less than a predetermined value, or in a state where the humidity of an installing space of the refrigerator is not less than a predetermined value.

In summary, the default values may be defined as values of the power consumption parameters which are set to maximum values. Accordingly, when the power consumption parameters are set to default values, the compressors 111 and 115 are operated at a maximum frequency within a predetermined range, the magnitudes of voltages applied to the fans 125, 155, and 165 are maximum, and the size of the temperature control interval of the storage compartment is minimum, and thus turned-on periods of the compressors 111 and 115 may be shortest (S12).

When the power consumption parameters are set to default values, it is recognized that n=0. Also, during the operation of the refrigerator, power consumption of the refrigerator is measured within the set period, and the measured data may be stored.

Specifically, the power consumption of the refrigerator may be determined as an accumulated power value during the set time within the turned-on/turned-off periods of the compressors 111 and 115. That is, within an interval from the turn-on time to the turn-off time of the compressors 111 and 115, information regarding power consumption of the compressors and a plurality of power consumption units which operate may be measured during the set time. For example, the set time may be 1 second.

As a result, from the turn-on time to the turn-off time of the compressors 111 and 115, power consumption during the set time is measured multiple times and an accumulated value of power consumption values measured multiple times is calculated. Thus, erroneous measurement of power consumption due to unpredictable and unstable operation of the power consumption units may be prevented, and an amount of power consumption of the refrigerator may be measured relatively accurately.

Also, the measured power consumption information may be stored in the memory part 230 (S13 and S14). Meanwhile, the operation S14 may be performed multiple times, and here, the power consumption information may be cumulatively stored in the memory part 230.

When the measurement and the data storage of power consumption are completed, it is recognized that n=n+1 (S15). Whether the currently stored (measured) power consumption information is smaller than the previously stored power consumption information, that is, whether the currently measured power consumption has a minimum value in comparison with one or more previously stored power consumption, may be recognized (S16).

When the currently stored power consumption information is smaller than the previously stored power consumption information in the memory part 230, it may be determined whether the n is not less than a predetermined value. When the n is not less than the predetermined value, the power consumption parameters may be finally determined (S17 and S18).

On the contrary, when the currently stored power consumption information is not a minimum value in comparison with previously stored power consumption information in the memory part 230, or when the n is smaller than the predetermined value, the power consumption parameters may be controlled to be changed (variable power consumption parameter control).

The case, in which the currently stored power consumption information is not a minimum value, means that the currently set power consumption parameters are not a combination for minimum power consumption, and therefore this case may be ruled out. Also, when the n is smaller than a predetermined value, the comparable power consumption information is not sufficiently accumulated in memory, and thus this case may be ruled out.

Meanwhile, when only the measured power consumption is stored in a state where the power consumption parameters are set to default values, the predetermined value should be not less than 2 because previously stored data does not exist.

The variable power consumption parameter control may include adjustment of the power consumption parameters, that is, adjustment of cooling capacity of the compressors, adjustment of voltages applied to the fans 125, 155, and 165, or adjustment of the temperature control interval of the storage compartment.

For example, a control may be performed such that the cooling capacity of the compressor decreases by a set amount. The set amount may be about 5%. When the cooling capacity of the compressor decreases by a set amount, turned-on period of the compressor may become longer in response to the decreased cooling capacity. Accordingly, when the cooling capacity of the compressor decreases, it does not necessarily mean that power consumption of the refrigerator decreases.

As another example, a control may be performed such that a voltage applied to the fan decreases by a set amount. When the voltage applied to the fan decreases, an output of the fan decreases and the temperature of the storage compartment does not reach a set temperature in a short time, thereby making turned-on periods of the compressors become longer. Accordingly, the decrease in the voltage applied to the fan does not necessarily mean that power consumption of the refrigerator decreases.

As still another example, a control may be performed such that the temperature control interval of the storage compartment increases.

Specifically, referring to FIG. 5, when a control is performed with the power consumption parameters being set to default values (default value control), an upper limit value for compressor control is set to To+ △ T1 and a lower limit value for compressor control is set to To− △ T1 with respect to a target temperature To of the storage compartment. Accordingly, when the temperature of the storage compartment is greater than the upper limit value, the compressor may be turned on, and when the temperature of the storage compartment decreases below the lower limit value, the compressor may be turned off. In this way, the compressors are periodically turned on/off, and the turned-on periods of the compressors at this time becomes TP1. Also, the temperature control interval may be W1.

In this state, when the variable power consumption parameter control is performed, the upper limit value may increase to To+ △ T2, and the lower limit value may decrease to To− △ T2. T2 may be greater than T1. Here, the turned-on period of the compressor may become TP2, and the temperature control interval may become W2. W2 may be greater than W1, and TP2 may be greater than TP1.

When the variable control is performed, in comparison with the default value control, the turned-on period of the compressor relatively become longer, and numbers of times of on/off switching of the compressors relatively become smaller.

Meanwhile, when the compressor is turned on from the turned-off state, current, which is an input value to the compressor, rapidly increases. After the rapid increase of the current, the state of the compressor is stabilized and the current decreases. That is, when the compressor is turned on, current larger than the reference current (reference value) flows, thus resulting in an increase in power consumption.

Accordingly, when the variable control is performed, although the turned-on period of the compressor increases, power consumption does not necessarily increase. This is because the number of turn-on times of the compressor decreases.

The above-described various embodiments of the variable control, that is, adjustment of cooling capacity of the compressors, adjustment of voltages applied to the fans, and adjustment of temperature control interval of the storage compartment, may be performed in combination with each other.

Alternatively, a set value at which cooling capacity of the compressor decreases may be changed, and a set value at which a voltage applied to the fan decreases, may be changed. Also, when a control is performed such that the temperature control interval of the storage compartment is changed, the upper and lower limit values may be set differently (S21).

After the power consumption parameters are controlled through the variable control, a process returns to operation S14, power consumption is then measured, and the measured data is cumulatively stored. Then, operations S15 to S17 are repeatedly performed, and thus a combination of the power consumption parameters capable of deriving minimum power consumption may be traced.

According to such a control method, when the power consumption parameters are finally determined at operation S18, it may be recognized whether a predetermined event occurs (S19). The predetermined event may include defrosting operations of the evaporators 150 and 160, opening of the refrigerator door, or turning on again after turning off the power of the refrigerator. When the predetermined event occurs, a process returns to operation S12, and the above-described operations are performed again.

When a defrosting operation of the evaporator is performed, an evaporation fan is turned off, and a reverse cycle of the refrigeration cycle may be performed or defrosting heater 180 may be operated. Thus, a normal operation of the refrigerator is limited. Accordingly, minimum power consumption parameters should be searched through new tracing steps for power consumption at this time. Accordingly, operation S12 may be performed again.

Likewise, when the refrigerator door is opened, the temperature of the storage compartment suddenly rises up to increase the load of the refrigerator. Also, when the refrigerator is turned on after being turned off, the load of the refrigerator increases, and thus it may be difficult to trace power consumption according to a normal operation of the refrigerator. Accordingly, operation S12 may be performed again.

When a predetermined event does not occur at operation S19, the operation of the refrigerator may be controlled by using the power consumption parameters finally determined at operation S18.

According to such a control method, power consumption is measured by using tuned-on periods of the compressors of the refrigerator, and the power consumption may be monitored while predetermined power consumption parameters is changed. Thus, power consumption parameters realizing minimum power consumption may be traced. Therefore, power consumption of the refrigerator may be improved and an electricity bill may be reduced.

According to embodiments, an amount of power consumed in operation of a refrigerator is measured, and whether power consumption parameters are changed is determined based on the measured amount of power consumption, and thus an optimal combination of the power consumption parameters may be derived. Also, the derived combination of the power consumption parameters is applied to a subsequent operation of the refrigerator, so that the power consumption of the refrigerator may be reduced.

Particularly, when the refrigerator is turned on and a compressor is started, the combination of the parameters allowing a minimum power consumption to be achieved can be automatically traced, while maximum values of the power consumption parameters are set and the parameters of the power consumption are changed, that is, as values of the power consumption parameters, operation time, or the like are changed.

Also, when a new event related to an operation of the refrigerator, for example, a defrosting operation or opening of a refrigerator door, etc., occurs, the above-described control method is performed again, and thus there is an effect in that an optimal operation condition may be derived according to an operation state of the refrigerator.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a refrigerator including a storage compartment, a compressor and a fan to supply air into the storage compartment, the method comprising:
    turning on power of the refrigerator and operating the compressor at a first frequency;
    obtaining a first power consumption of the refrigerator during a set time within a turn-on period of the compressor, the first power consumption being determined by a first combination of power consumption parameters measured during the set time;
    determining whether the obtained first power consumption is less than a second power consumption stored in a memory, the memory being configured to store a second combination of power consumption parameters to form the second power consumption; and
    updating the memory when the obtained first power consumption is less than the second power consumption, the updating the memory including that the second combination of power consumption parameters stored in the memory is changed to the first combination of power consumption parameters, and thereafter operating the compressor at the first frequency; and
    performing a variable power consumption parameter control when the obtained first power consumption is greater than the second power consumption,
    wherein the first or the second combination of power consumption parameters includes a combination of a cooling capacity of the compressor, a voltage applied to the fan, and a temperature control interval of the storage compartment, and
    wherein performing a variable power consumption parameter control includes at least one of:
        decreasing a frequency of the compressor from the first frequency to a second frequency or increasing the turn-on period of the compressor, and
        increasing the temperature control interval of the storage compartment or decreasing a number of times of on or off switching of the compressor.

2. The method according to claim 1, wherein the increasing the temperature control interval of the storage compartment includes:
    increasing an upper limit value (To+ΔT1) with respect to a target temperature (To) of the storage compartment; and
    decreasing a lower limit value (To−ΔT1).

3. The method according to claim 1, wherein the set time is at least one second.

4. The method according to claim 1, wherein the compressor includes:
    a first compressor that compresses a refrigerant to perform a first stage compression of the refrigerator; and
    a second compressor that compresses the refrigerant compressed in the first compressor to perform a second stage compression of the refrigerator.

5. The method according to claim 4, further comprising a controller to drive the first and the second compressors,
    wherein the obtaining of the first power consumption of the refrigerator includes calculating power consumption of the compressors by using power information of the first and the second compressors, which is detected at the controller.

* * * * *